United States Patent
Cruickshank

(10) Patent No.: US 6,704,294 B1
(45) Date of Patent: Mar. 9, 2004

(54) ESTABLISHMENT OF A PSTN AND INTERNET MULTIMEDIA COLLABORATION SESSION

(75) Inventor: Brian Cruickshank, Oakville (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/417,047

(22) Filed: Oct. 13, 1999

(51) Int. Cl.[7] ................................................ H04J 15/00
(52) U.S. Cl. .................................. 370/265; 370/352
(58) Field of Search .............................. 370/260, 261, 370/265–267, 271, 352

(56) References Cited

U.S. PATENT DOCUMENTS 5,689,641 A  * 11/1997 Ludwig et al. .............. 370/260
5,978,463 A  * 11/1999 Jurkevics et al. ........... 370/261

OTHER PUBLICATIONS

Bob Summers, Official Microsoft NetMeeting Book, 1998, pp. 5, 6, 10, 11, 203, 204.

* cited by examiner

*Primary Examiner*—Salvatore Cangialosi
(74) *Attorney, Agent, or Firm*—Kevin L. Smith

(57) ABSTRACT

Parallel data network and telephone network communications are established to facilitate a collaboration combining the data transfer and document sharing strengths of a data network with the superior audio communication of a telephone network. The method involves receiving an identifier of a calling station and called station, determining the IP addresses of computers associated with the calling station and called station, and causing the computers of the called and calling stations to establish a data-only collaboration. In an alternative embodiment, the method additionally involves determining the CLIDs associated with the calling and called stations, and connecting the telephones of the called and calling stations.

17 Claims, 11 Drawing Sheets

ESTABLISHMENT OF A PSTN AND INTERNET MULTIMEDIA COLLABORATION SESSION

FIELD OF THE INVENTION

The invention relates to a method and apparatus for establishing parallel data network and telephone network communications to facilitate a collaboration combining the data transfer and document sharing strengths of a data network with the superior audio communication of a telephone network.

BACKGROUND OF THE INVENTION

Communication over distances is important for the organization and completion of work in modem life. Examples of well-established forms of communication include telephone communication; and video communication through the use of existing teleconferencing facilities. The introduction of computers has given rise to a number of newer communication applications. These include voice over the Internet and video over the Internet. They also include applications that share data, including wordprocessing documents (and any graphical images incorporated therein) and presentation documents. In particular, some applications allow multiple users to simultaneously share and alter a common document. Known communication systems also include file sharing (often through an ftp protocol), "chat" lines and whiteboards.

It is known to collect data and voice communications into a combined application on a data network so these forms of communication can be used simultaneously for collaboration. An example of such an application is Microsoft™ NetMeeting™, which combines capability for video and audio communication, application sharing, file transfer, whiteboard, and chat.

The performance of such collaboration products is constrained by the available bandwidth: the rate at which information can be transmitted between computers. Typically, such constraints are reflected in poor audio and poor video performance. For example, the book "Official Microsoft NetMeeting Book" (Bob Summers, Microsoft Press, 1998) lists the following commonly encountered problems at p. 10:

there is a delay in your voice;
the audio is not full-duplex, which means only one person can speak at one time;
the audio often crackles, or pauses, and an occasional word or two disappears;
the video is small, fuzzy, and movement is jerky.

In addition, deterioration in performance, most often manifested in poor audio performance, is increased as the amount of information passing simultaneously between users increases.

These issues are complicated when the communication and sharing does not take place inside a Local Area Network (or LAN, a data network typically used within a single organization) but instead travels over the Internet. Data over the Internet and on many LANs, including those connected to the Internet, accords to the Internet Protocol (IP). There are several levels in the IP. Prudent information technology management practice includes placing a "firewall" between the Internet and a LAN, which functions by examining incoming data from the Internet and blocking signals that are not formatted in certain (usually high-level) IPs. Firewalls are also used on LANs to mask the IP addresses of computers behind the firewall. This ensures that data must first be sent through the firewall to a web server associated with the firewall before being passed on to the destination computer. (Such data must typically contain some identifier of the destination computer which is recognizable by the web server. The web server will match the identifier against a list of IP addresses to determine the IP address of the destination computer. The web server will then transmit the data to the destination computer across the LAN.)

Most of the data passed between users in a collaboration can be passed using the highlevel Transfer Control Protocol (TCP) which is not blocked in a typical firewall configuration. The International Telecommunications Union (ITU) standard for data sharing in collaboration applications, T.120, is a TCP format. Although the ITU standard for video and audio call setup and control, H.323, is also a TCP format, the actual transfer of audio and video information occurs using the lower-level User Diagram Protocol (UDP), which is often blocked by intervening firewalls. Furthermore, audio and video transmissions often use secondary connections (additional communication connections made simultaneously after a first connection) which are also often disallowed by firewalls. As a result, video and audio communication can be severely restricted or even blocked if it must pass through a firewall. Although firewalls can be configured specifically to allow video and audio communication activities, this involves configuring the system to allow uncontrolled inquiries, which significantly compromises system security and may be an unacceptable risk to many system administrators.

SUMMARY OF THE INVENTION

The present invention provides a method to set up parallel data (e.g. Internet) and telephone connections for non-voice collaboration communications and voice communications, respectively. This allows the combination of the general collaboration information sharing, such as whiteboarding and shared wordprocessing documents, with the superior voice performance of telephone connections. It will also allow greater use of collaboration over the Internet between LANs, as the voice communications which cause the greatest difficulty with firewalls are removed from the Internet to the telephone network.

In accordance with the present invention, there is provided a method for establishing a collaborative session between a calling station and a called station, comprising: receiving an identifier of a first station and a second station, each of said first station and second station comprising a telephone connected to a switched telephone network and a computer connected to a data network; causing establishment of a telephone connection between said telephone of said first station and said telephone of said second station over said switched telephone network where such a connection does not already exist; commanding said computer of said first station to launch a collaborative session with said computer of said second station over said data network with audio disabled.

The invention also contemplates a computer readable medium, computer data signal, and apparatus for carrying out this method.

Other aspects of the present invention will become apparent to those ordinarily skilled in the are upon review of the following description of specific embodiments of the invention in conjunction with the following figures.

BRIEF DESCRIPTION OF THE DRAWINGS

In the figures which illustrate example embodiments of the invention.

DETAILED DESCRIPTION OF THE PREFERRED EMBODIMENT

Figure 1:
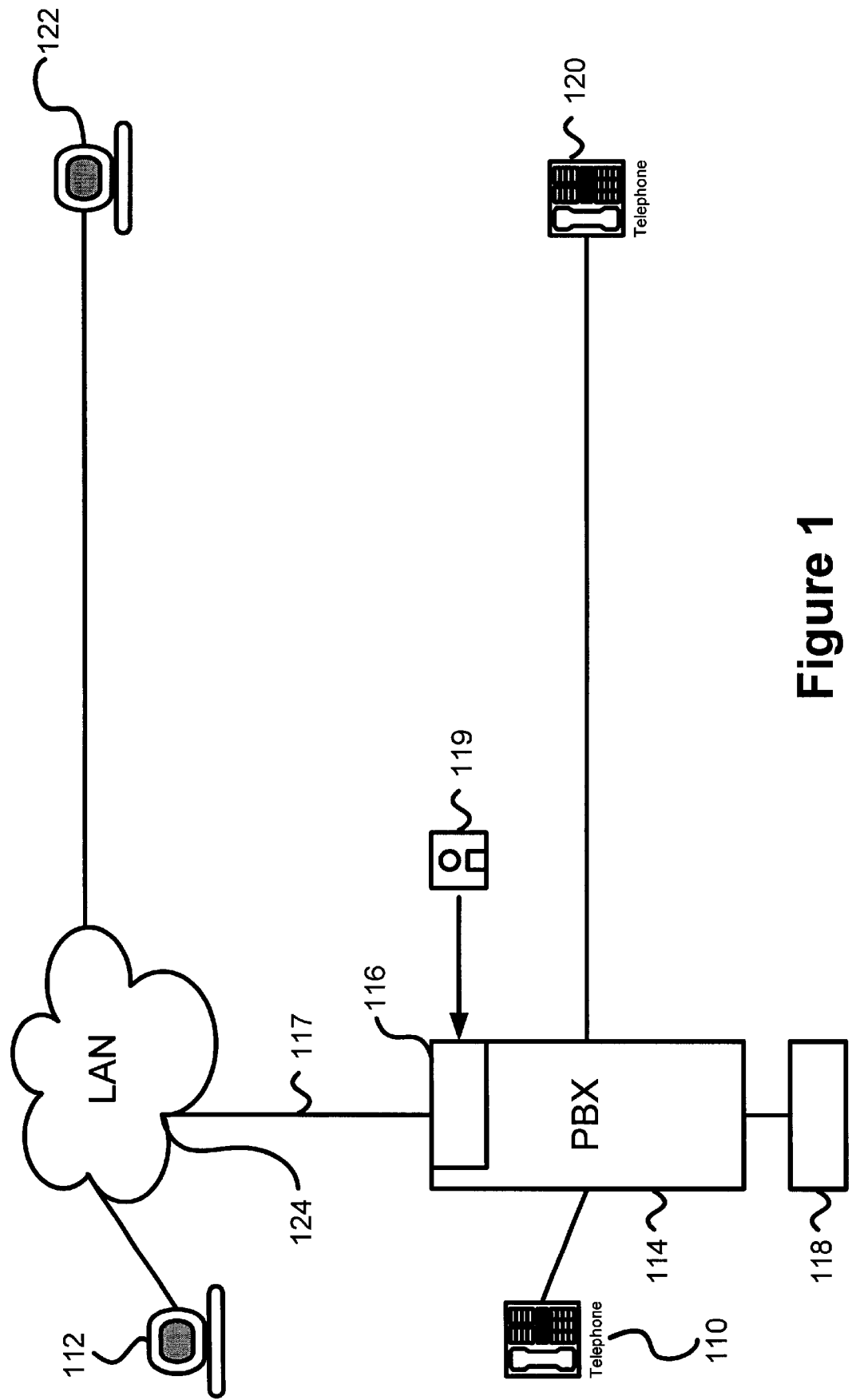
FIG. 1 is an exemplary block diagram of an example of the application of this invention within a local area net (LAN)

FIG. 1 is an exemplary block diagram of an example of the application of this invention within a local area network (LAN) and private branch exchange (PBX), as might be typical within a given company. Turning to FIG. 1, there is provided a telephone 110 and personal computer 112 located proximately and provided for the use of a person in establishing a collaboration connection (the collaboration call "initiator"). Together, personal computer 112 and telephone 110 are referred to as the "calling station". Telephone 110 is connected to Private Branch exchange (PBX) 114, which is a telephone switch. Telephone 110 is provisioned with a special "collaboration" button which, when pressed, provides a collaboration request to the PBX. PBX 114 has a resident "collaboration" application 116. PBX 114 is connected to LAN 124 by a special dataline 117. PBX 114 is also connected to a database 118, which may be either internal or external to the PBX 114 and stores Internet Protocol addresses in association with identification numbers and telephone numbers. PBX 114 is also connected to telephone 120 of the person to whom the collaboration call is being sent. The personal computer 112 of the person making the call is connected to the personal computer 122 of the person to whom the collaboration call is being sent via LAN 124. Personal computer 122 and telephone 120 are also located proximately, and are used by the intended recipient of the collaboration call. Together, telephone 120 and personal computer 122 are referred to in this embodiment as the "called station".

In operation, the person making the call may pick up the receiver of telephone 110 and press the designated "collaboration" button. After hearing a distinctive dialtone (to confirm that he has been "connected" to a collaboration facility of PBX 114) he dials the identification number of the intended recipient of the collaboration call. Typically, this identification number might be the collaboration call recipient's telephone number, extension number or the numeric equivalent of the recipient's name (using the number to letter translations on a typical telephone keypad). The identification number is transmitted to application 116 resident in PBX 114.

Figure 2:
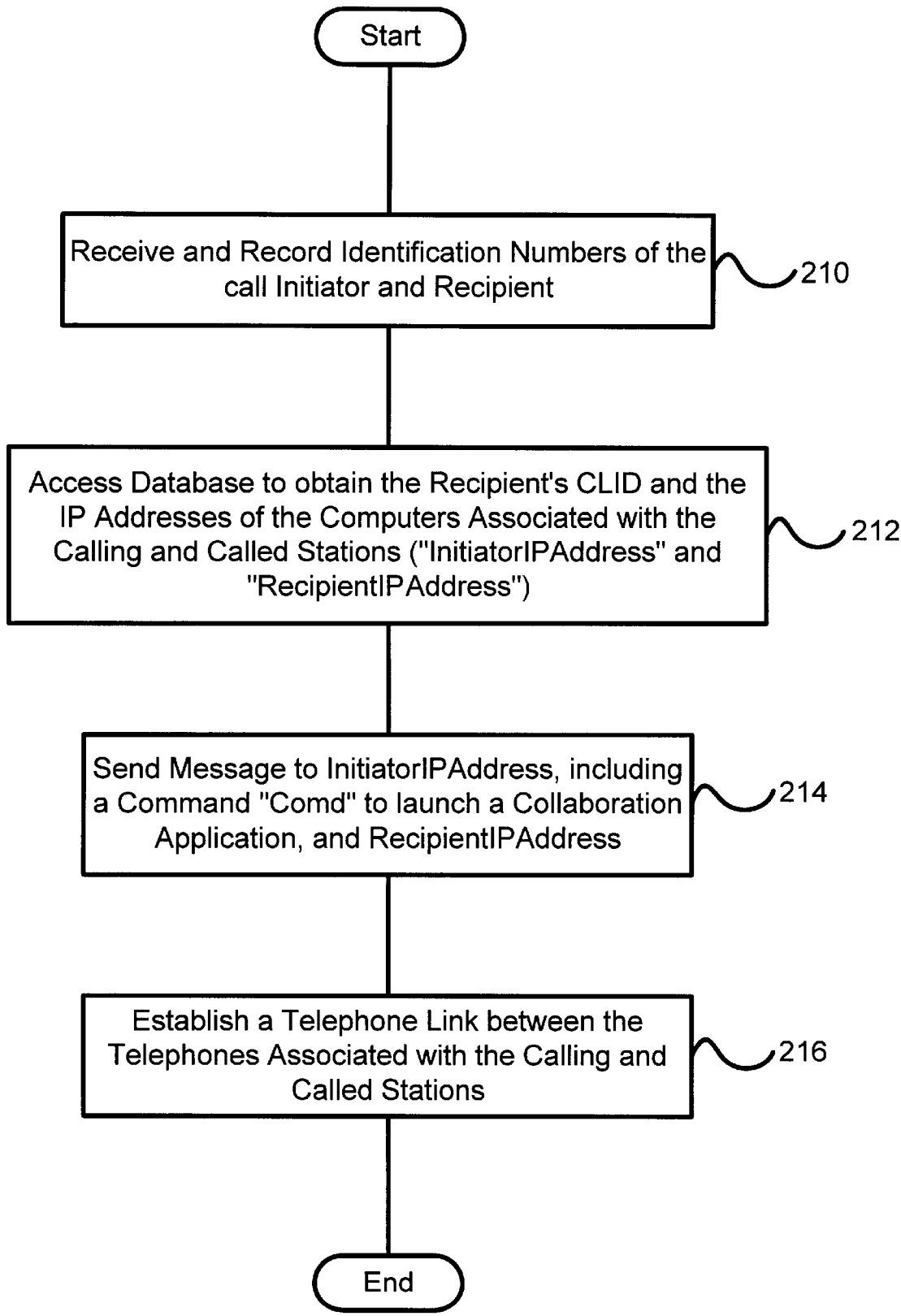
FIG. 2 is a flow diagram of a method of operating a Private Branch Exchange (PBX) in accordance with the present invention.

The operation of application 116 in PBX 114 is illustrated in FIG. 2. Turning to FIG. 2, application 116 first receives and records the identification numbers of both the initiator of the collaboration call and the recipient of the collaboration call (step 210). Application 116 receives these identification numbers via an interface such as TAPI (Telephony Applications Programming Interface) by Microsoft™ or TSAPI (Telephony Server Applications Programming Interface) by Novell/HP™. With the identification numbers, application 116 accesses database 118 to obtain the IP addresses of both the computer 112 associated with the calling station ("InitiatorIPAddress") and computer 122 associated with the called station ("RecipientIPAddress"), as well as the CLID (caller ID) of the telephone 120 associated with the called station (step 212). Database 118 may consist of a simple table of matched identification numbers, phone numbers and IP addresses. Application 116 then sends a message on line 117 to the personal computer 112 associated with the calling station (using the IP address from database 118), instructing the computer 112 to initiate a collaboration connection with the computer at RecipientIPAddress. This message therefore includes RecipientIPAddress and a command "Comd" to launch a collaboration application with audio and video communication disabled (step 214). Finally, application 116 establishes a telephone link between telephone 110 associated with the calling station and telephone 120 associated with the called station through PBX 114 (step 216).

Figure 3:
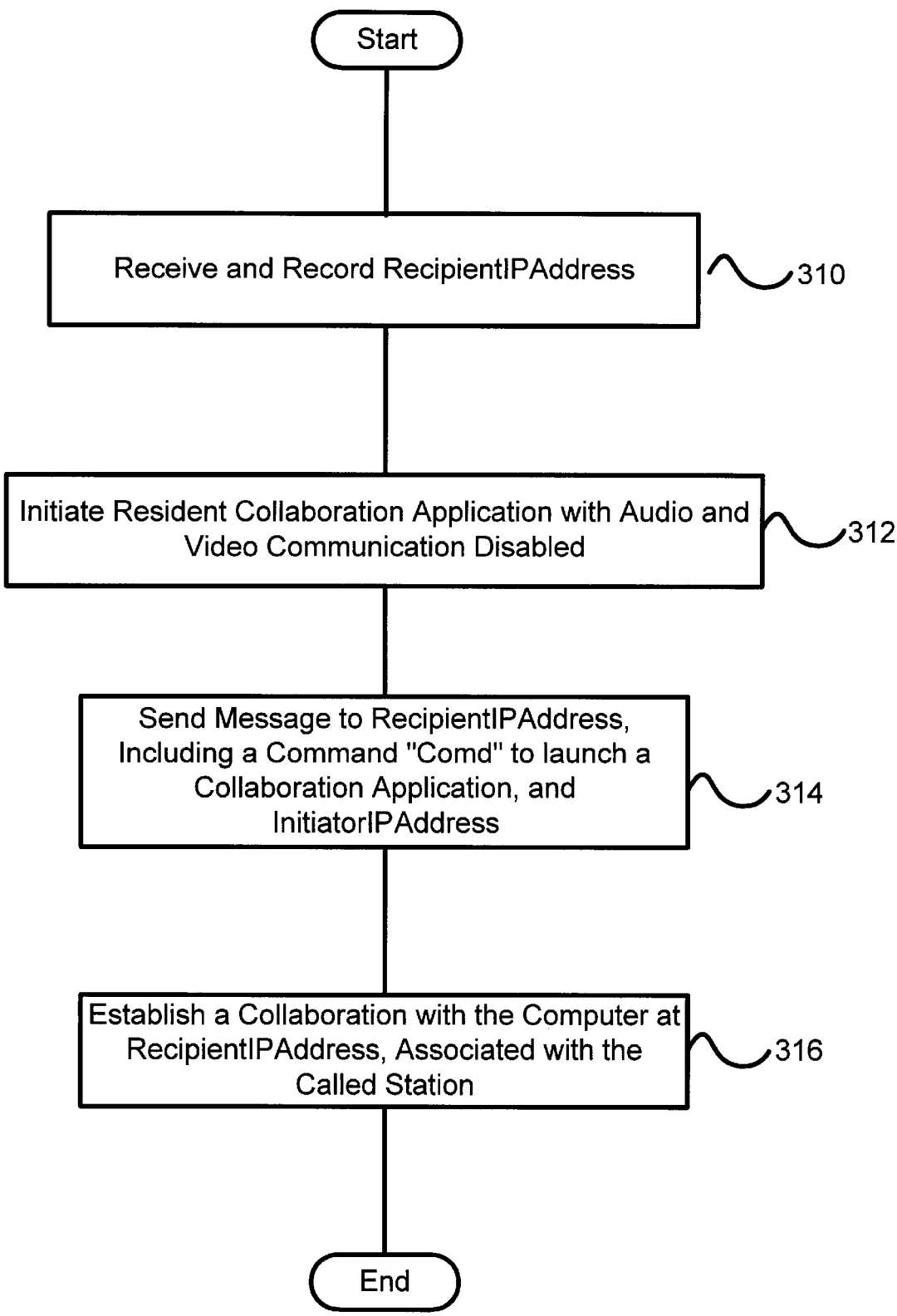
FIG. 3 is a flow diagram of a method of operating a personal computer (PC) associated with a calling station in accordance with the present invention.

The operation of personal computer 112 after receiving the message from application 116 (in step 214) is illustrated in FIG. 3. Turning to FIG. 3, personal computer 112 first stores RecipientIPAddress (step 310). Personal computer 112 then initiates a resident collaboration application with audio and video communication disabled (step 312). The collaboration application can be accessed by a user through the peripheral devices of personal computer 112, such as a video monitor, keyboard and mouse. Personal computer 112 then uses RecipientIPAddress to send a message to personal computer 122 associated with the called station via LAN 124 (step 314), and then establishes a collaboration connection with personal computer 122 (step 316). The message sent in step 314 would include a command "Comd" to computer 122 to launch a collaboration application and the IP address of computer 112 "InitiatorIPAddress".

Figure 4:
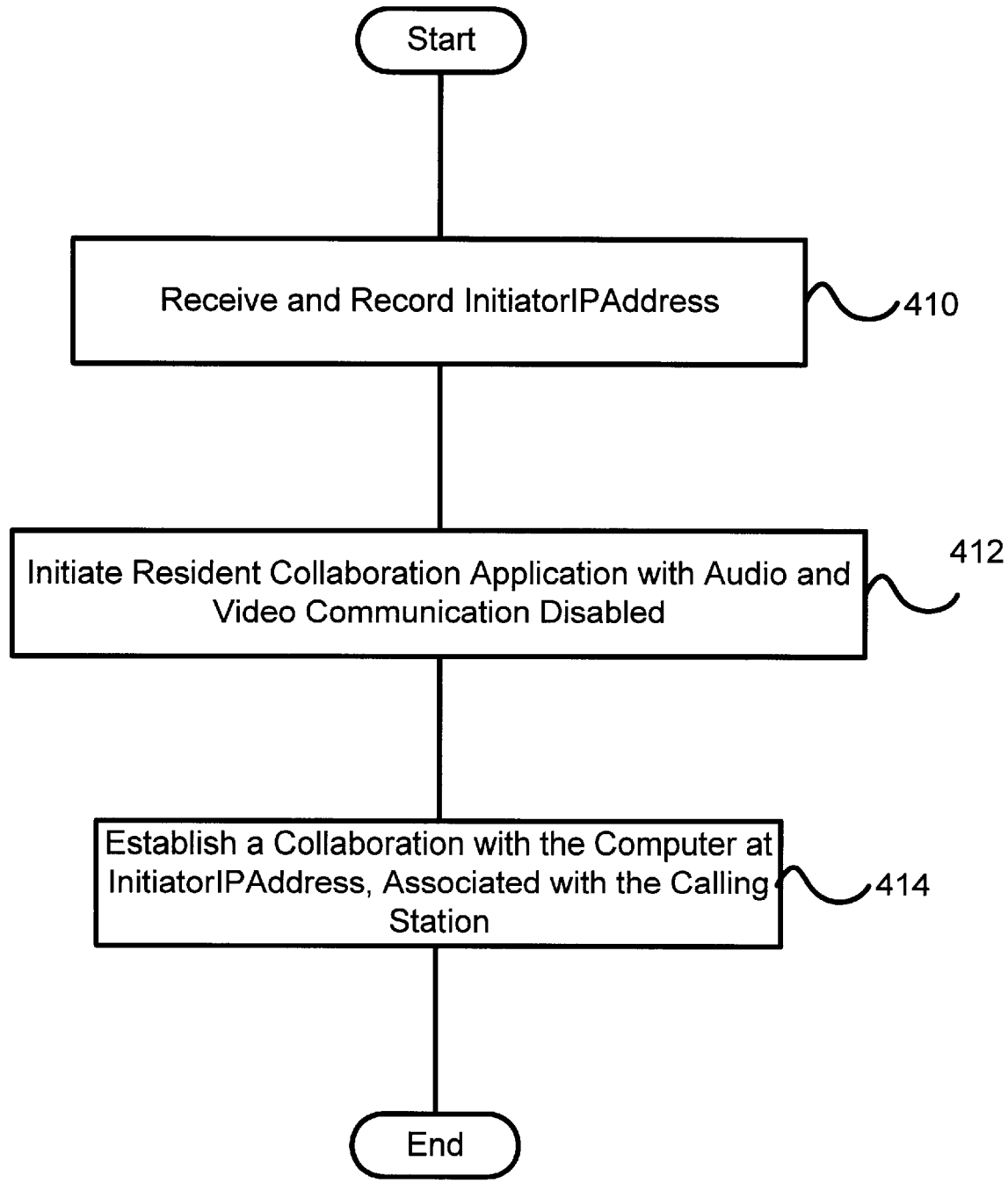
FIG. 4 is a flow diagram of a method of operating a personal computer (PC) associated with a called station in accordance with the present invention.

The operation of personal computer 122 after receiving the message from personal computer 112 (in step 314) is illustrated in FIG. 4. Turning to FIG. 4, personal computer 122 first stores InitiatorIPAddress (step 410). Personal computer 122 then initiates a resident collaboration application with audio and video communication disabled (step 412). The collaboration application can be accessed by a user through the peripheral devices of personal computer 122, such as a video monitor, keyboard and mouse. Personal computer 122 then uses InitiatorIPAddress to send a reply message to personal computer 112 associated with the calling station via LAN 124, and then establishes a collaboration connection with personal computer 112 (step 414).

By following these steps, parallel communications will have been established between: (i) the call initiator's and the call recipient's telephones 110 and 120, associated with the calling and called stations, respectively; and (ii) the call initiator's and call recipient's personal computers 112 and 122, associated with the calling and called stations, respectively. As a result, the collaboration can proceed with the superior voice communication of the telephone combined with the document sharing capabilities of the collaboration applications.

The resident collaboration applications in personal computers 112 and 122 may be any compatible collaboration applications, although for optimum performance they should be identical applications.

In cases where the initiator's computer 112 cannot complete the collaboration connection (either because PBX 114 does not have an IP address for computer 122, or because an IP connection cannot be established between computers 112 and 122), the initiator's computer will create a window on the screen on computer 112 informing the initiator that the attempt to establish a collaboration has failed, and a reason for the failure.

In the above description, the collaboration applications were launched with their audio and video communications deactivated. One alternative embodiment would be to launch the collaboration applications with only the audio communications deactivated.

The PBX 114 may be loaded with application 116 in accordance with this invention via software medium 119. Additionally, application 116 may be loaded into the PBX 114 via another software medium. While software medium 119 is illustrated as a computer diskette, it could equally be a tape, memory chip, or other removable computer readable medium. Furthermore, the software medium may be a remote medium, such as a memory of a remote computer, and be downloaded over a suitable link such as over an internet, intranet, dedicated data link, or the like.

In an alternative embodiment, telephone 110 does not have a collaboration button. Instead, the caller may dial a special collaboration number. As a further alternative, PBX 114 may attempt to establish a collaboration call in respect of all calls placed through telephone 110.

Figure 5:
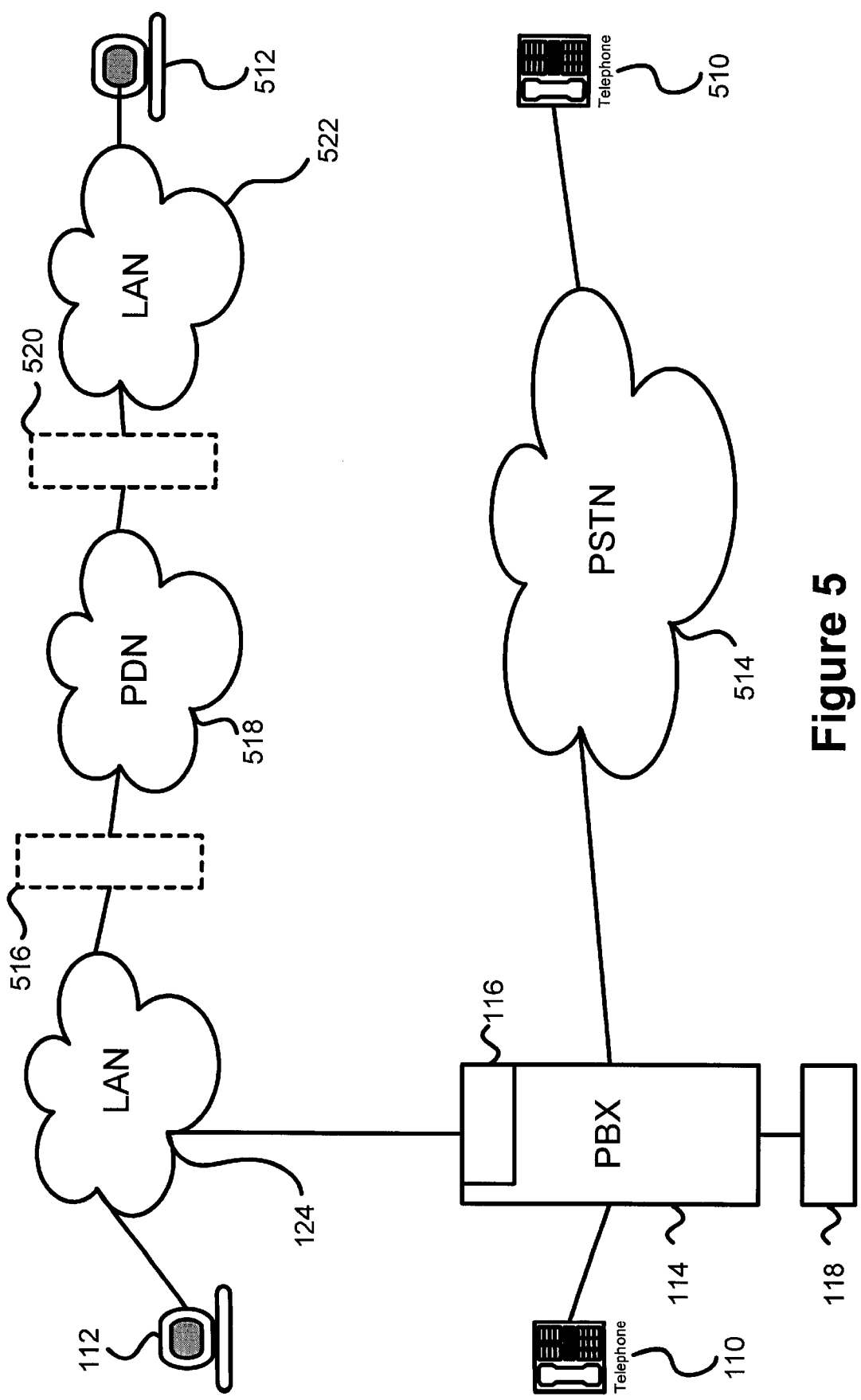
FIG. 5 is an exemplary block diagram of an example of the application of this invention across the Internet without an intervening firewall.

It will be appreciated by those skilled in the art that where the personal computer of the intended recipient of the collaboration call is attached to a different LAN than LAN 124, where the telephone of the intended recipient of the collaboration call is not connected directly to PBX 114, or where both variations occur, the above embodiment of the invention will function with only slight modifications provided there are no intervening firewalls, or if any intervening firewalls are configured to allow the direct addressing of the computer of the collaboration call recipient by the computer of the collaboration call initiator. Such a modified system is illustrated in FIG. 5. The apparatus illustrated in FIG. 5 is similar to the apparatus of FIG. 1, and like parts have been given like reference numbers. Turning to FIG. 5, there is a telephone 510 and a personal computer 512, proximately located and used by the intended recipient of the collaboration call. Together, telephone 510 and personal computer 512 are referred to in this embodiment as the "called station". A public switched telephone network (PSTN) 514 is located between telephone 510 and PBX 114. In between personal computer 512 and LAN 124 is LAN 522 and a packetized data network (PDN) 518. Optionally, there are firewalls 516 and 520 (shown in dotted outline) between LAN 124 and packetized network 518, and between packetized network 518 and LAN 522 respectively. Any such firewalls 516 and 520 are configured to allow the direct addressing of the computer of the collaboration call recipient by the computer of the collaboration call initiator.

The operation of the system of FIG. 5 is as described in conjunction with FIGS. 2 to 4. However, the following is noted:

(I) Since the personal computer 512 associated with the called station is not directly connected to LAN 124, the messages travelling between computers 112 and 512 in steps 314, 316, and 414 will pass through LANs 124 and 522, PDN 518, and, where present, firewalls 516 and 520.

(II) Since the telephone 510 associated with the called station is not connected directly to PBX 114, in step 216 application 116 will connect telephones 110 and 510 through PSTN 514.

It will be appreciated by those skilled in the art that another PBX may be present between PSTN 514 and telephone 510 without any change in the described operation of the invention.

Figure 6:
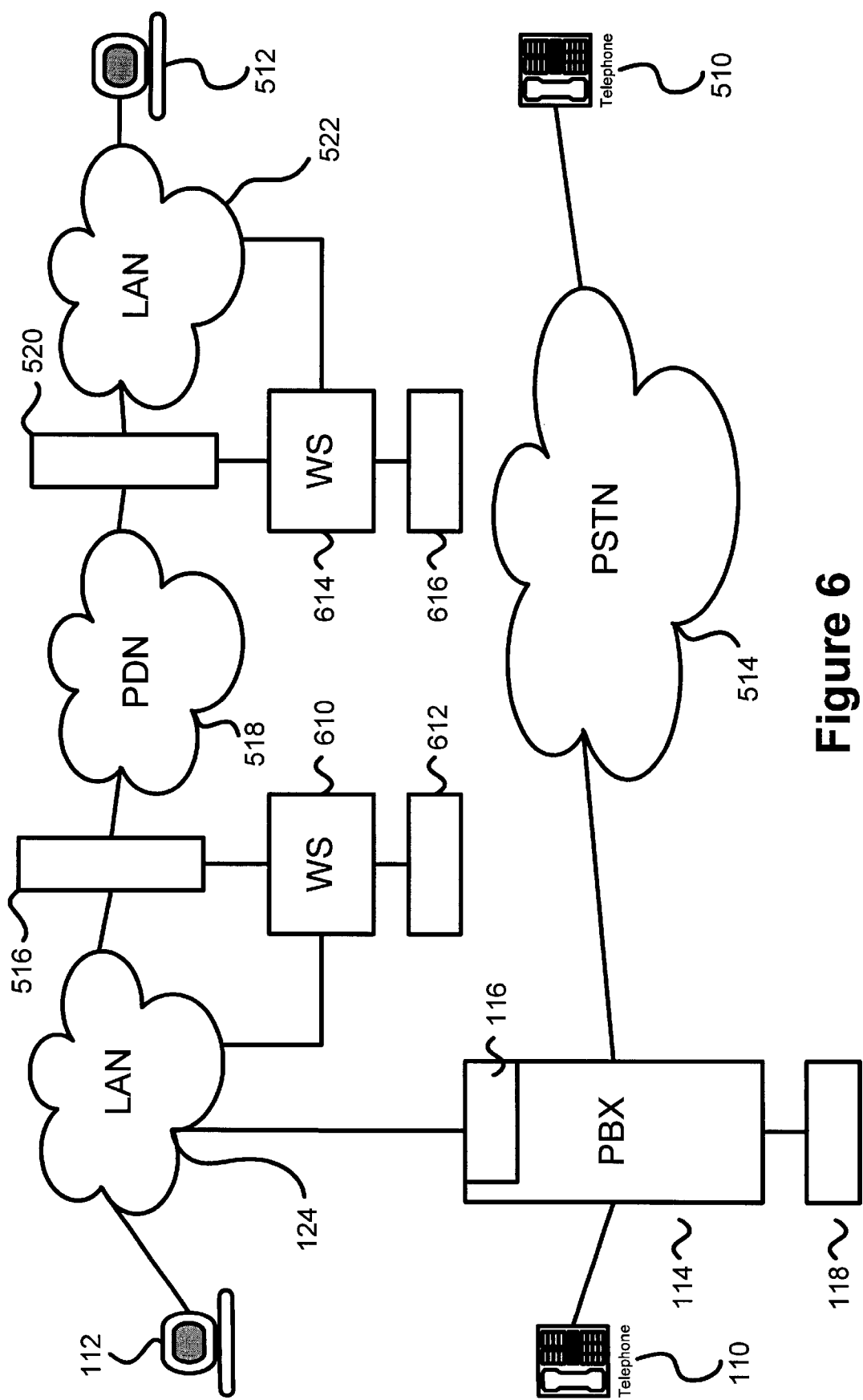
FIG. 6 is an exemplary block diagram of an example of the application of this invention across the Internet with an intervening firewall.

A third embodiment of the invention applies when the computers of the calling and called stations are separated by firewalls that prevent the computer associated with the calling station from directly addressing the computer associated with the called station and vice-versa, and is illustrated in FIG. 6. The apparatus illustrated in FIG. 6 is similar to the apparatus of FIG. 5, and like parts have been given like reference numbers. Turning to FIG. 6, a web server (WS) 610 is in communication with LAN 124, firewall 516, and a database 612. Similarly, a web server 614 is in communication with LAN 522, firewall 520, and a database 616. As in the embodiment of FIG. 5, there is a telephone 510 and a personal computer 512, proximately located and used by the intended recipient of the collaboration call. Together, telephone 510 and personal computer 512 are referred to in this embodiment as the "called station".

In operation, the person making the call may pick up the receiver of telephone 110 and press a designated "collaboration" button. After hearing a distinctive dialtone (to confirm that he has been "connected" to a collaboration facility of PBX 114) he dials the identification number of the person who he is trying to contact, which is assumed to be a person at the called station represented by phone 510 and computer 512. Typically, this identification number might be the collaboration call recipient's telephone number, extension number or the numeric equivalent of the recipient's name (using the number to letter translations on a typical telephone keypad). The identification number is transmitted to application 116 resident in PBX 114.

Figure 7:
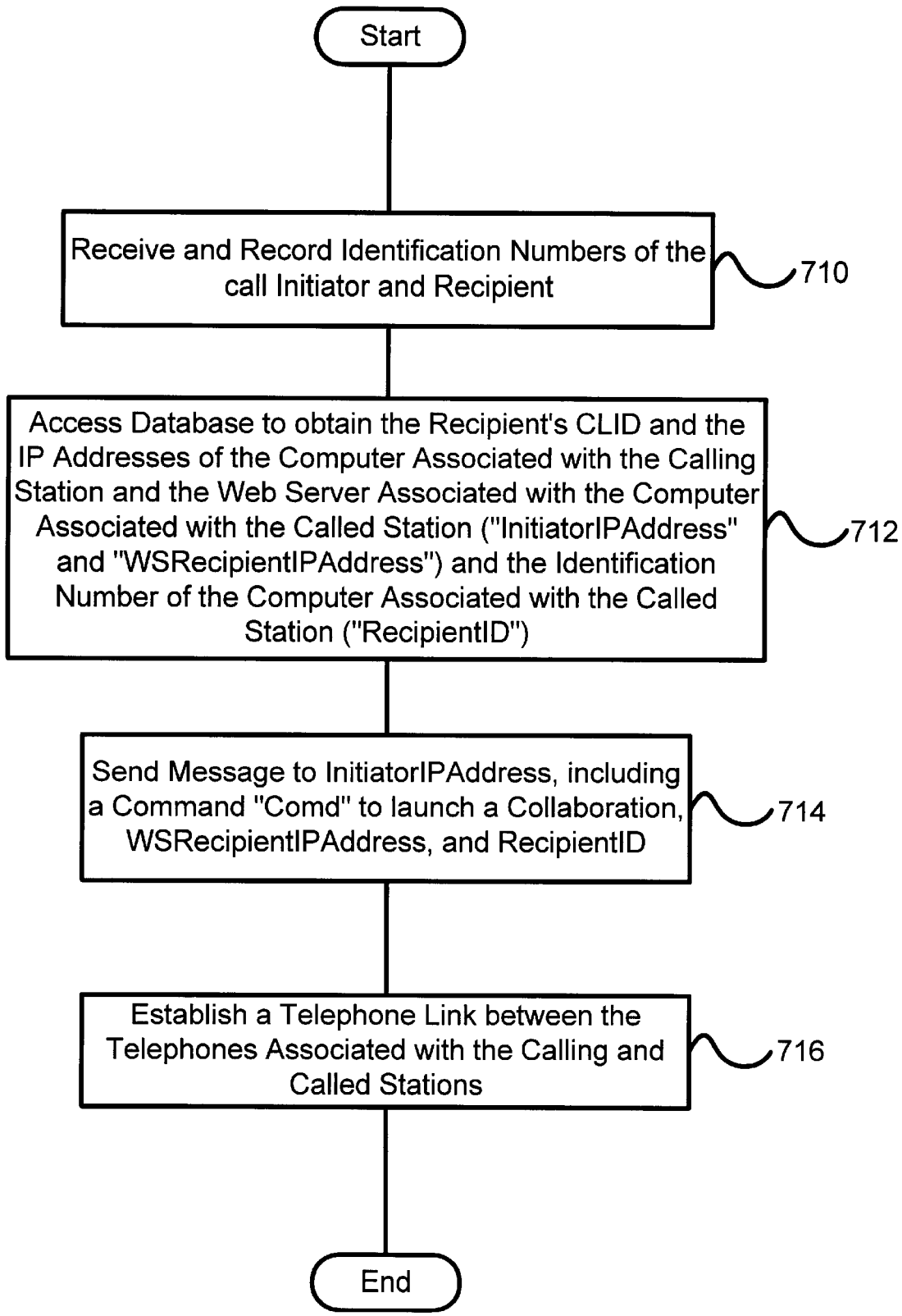
FIG. 7 is a flow diagram of a method of operating a Private Branch Exchange (PBX) in accordance with the present invention.

The operation of application 116 in PBX 114 is illustrated in FIG. 7. Turning to FIG. 7, application 116 first receives and records the identification numbers of both the initiator of the collaboration call (InitiatorID) and the recipient of the collaboration call (RecipientID) (step 710). Application 116 receives these identification numbers via an interface such as TAPI (Telephony Applications Programming Interface) by Microsoft™ or TSAPI (Telephony Server Applications Programming Interface) by Novell/HP™. Application 116 then accesses database 118 to obtain the IP address of the computer 112 associated with the calling station ("InitiatorIPAddress"), the web server address of web server (WS) 614 associated with the computer 512 associated with the called station ("WSRecipientIPAddress"), a computer identifier for the computer 512 associated with the called station ("RecipientID"), and the CLID of the telephone 510 associated with the called station (step 712). Database 118 may be a distributed database which is accessible via packetized data network 518. Such a database could be modelled on the DNS (Directory Name Service) used in the Internet, or upon LDAP (Lightweight Directory Access Protocol) which is described in IETF (Internet Engineering Task Force) publications 1777, 1778 and 1823.

Application 116 then sends a message to the personal computer 112 associated with the calling station (using InitiatorIPAddress from database 118), instructing computer 112 to initiate a collaboration with the computer identified by RecipientID accessible through a web server having IP address WSRecipientIPAddress (step 714). This message will include the command "Comd" to launch a collaboration application (with a requirement that the audio be disabled), WSRecipientIPAddress, and RecipientID. Finally, application 116 establishes a telephone link between telephone 110 of the initiator of the collaboration call and telephone 510 of the recipient of the collaboration call (step 716).

Figure 8:
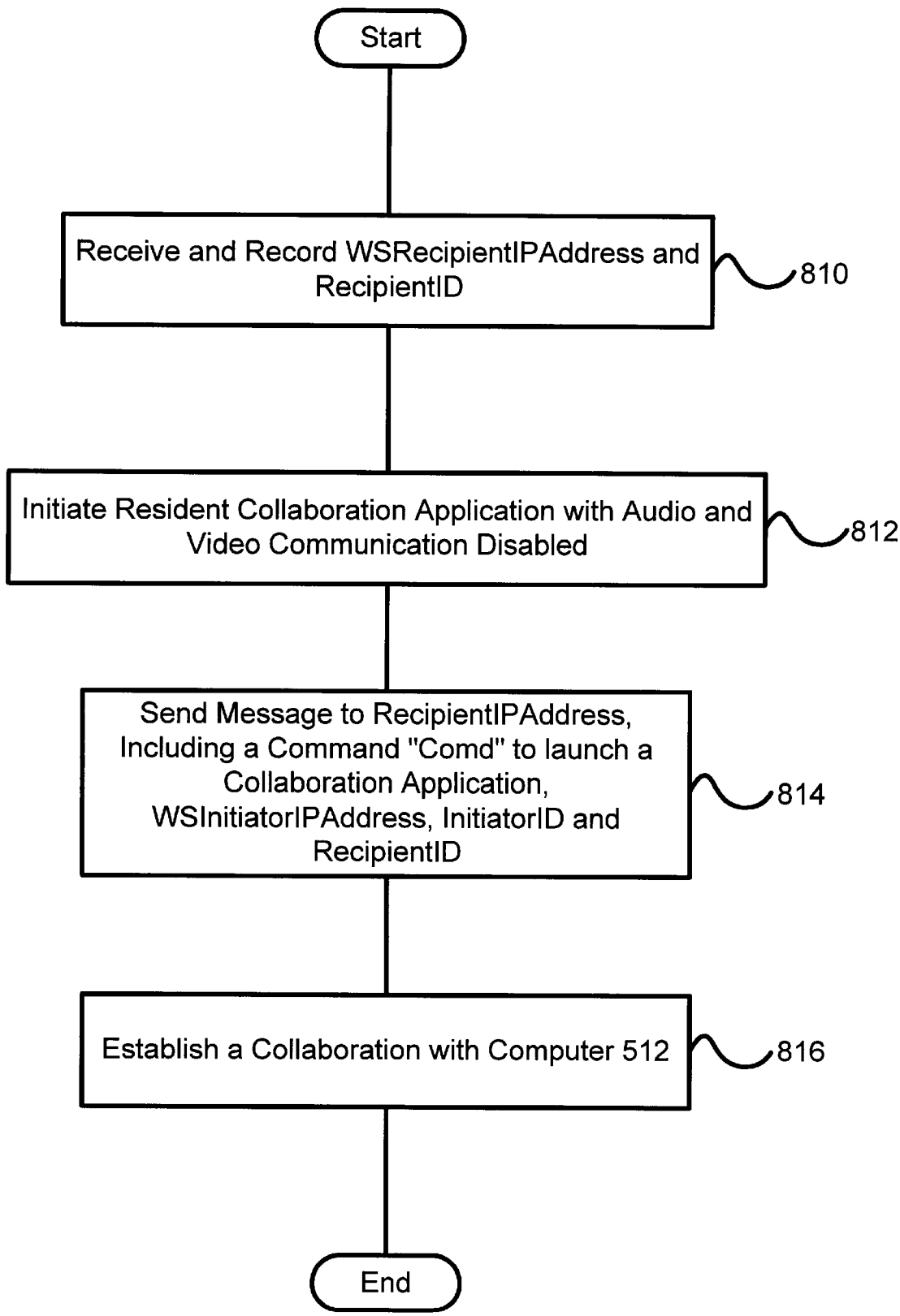
FIG. 8 is a flow diagram of a method of operating a personal computer associated with a calling station in accordance with the present invention.

The operation of personal computer 112 after receiving a message from application 116 (in step 714) is illustrated in FIG. 8. Turning to FIG. 8, personal computer 112 first stores WSRecipientIPAddress and RecipientID (step 810). Personal computer 112 then initiates a resident collaboration application with audio and video communication disabled (step 812). The collaboration application can be accessed by a user through the peripheral devices of personal computer 112, such as a video monitor, keyboard and mouse. Personal computer 112 then uses WSRecipientIPAddress to send a message to web server 614 associated with the computer 512 associated with the called station via LAN 124, firewall 516, PDN 518, and firewall 520. This data includes a command ("Comd") to initiate the collaboration as well as WSInitatorIPAddress, InitiatorID, and RecipientID (step 814). Personal computer 112 then waits for a reply signal from personal computer 512 associated with the called station and then establishes a collaboration connection with personal computer 512 via web server 614 (step 316).

Figure 9:
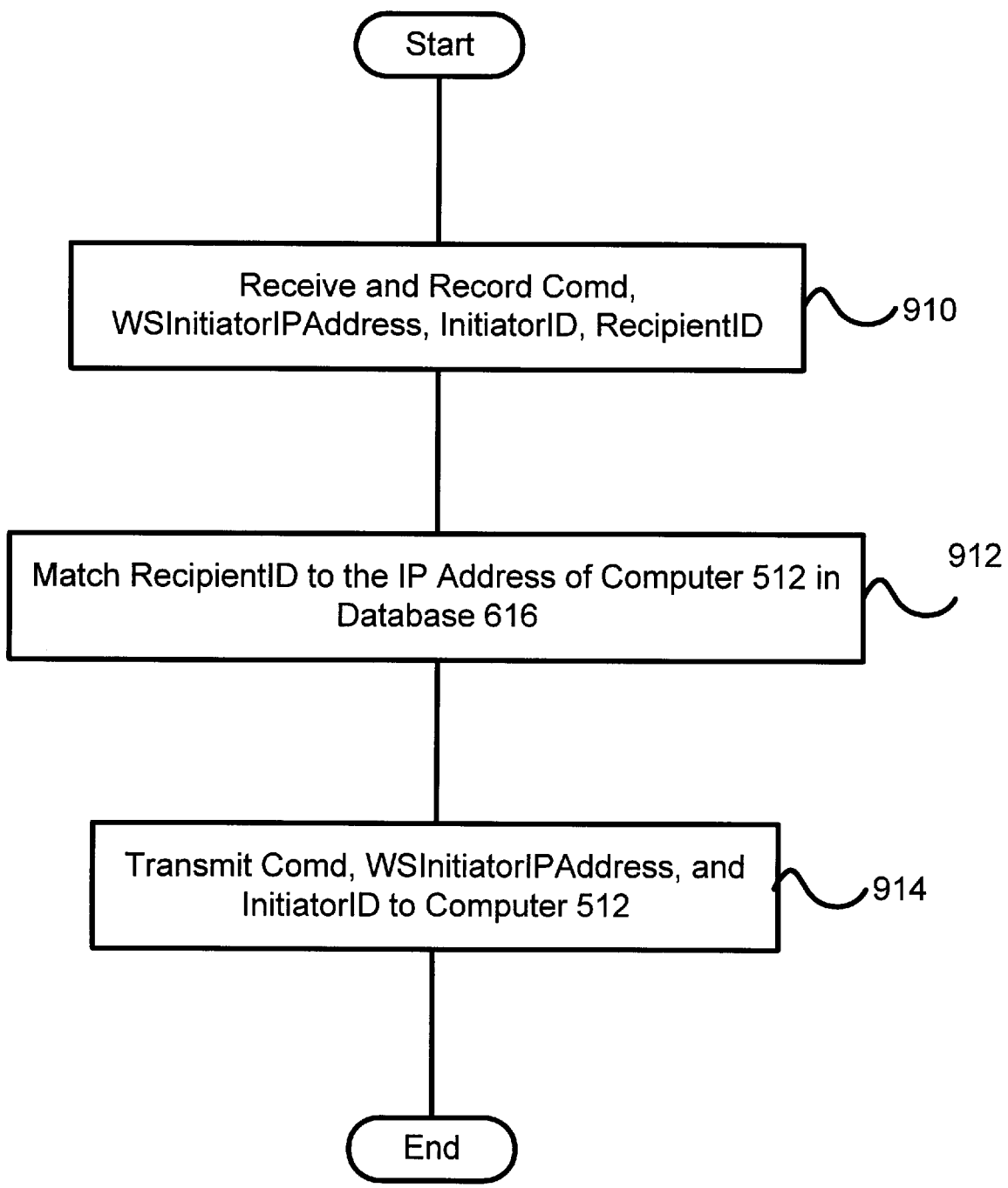
FIG. 9 is a flow diagram of a method of operating a web server associated with a computer associated with a called station in accordance with the present invention.

The operation of web server 614 after receiving a message from personal computer 112 (in step 314) is illustrated in FIG. 9. Turning to FIG. 9, web server 614 first receives the message from computer 112 and stores Comd, WSInitatorIPAddress, InitiatorID, and RecipientID (step 910). Web server 614 then matches RecipientID with the IP address of recipient computer 512 associated with the called station in database 616 (step 912). Then, web server 614 transmits the received message (Comd, WSInitiatorIPAddress, InitiatorID) to personal computer 512 via LAN 522 (step 914).

Figure 10:
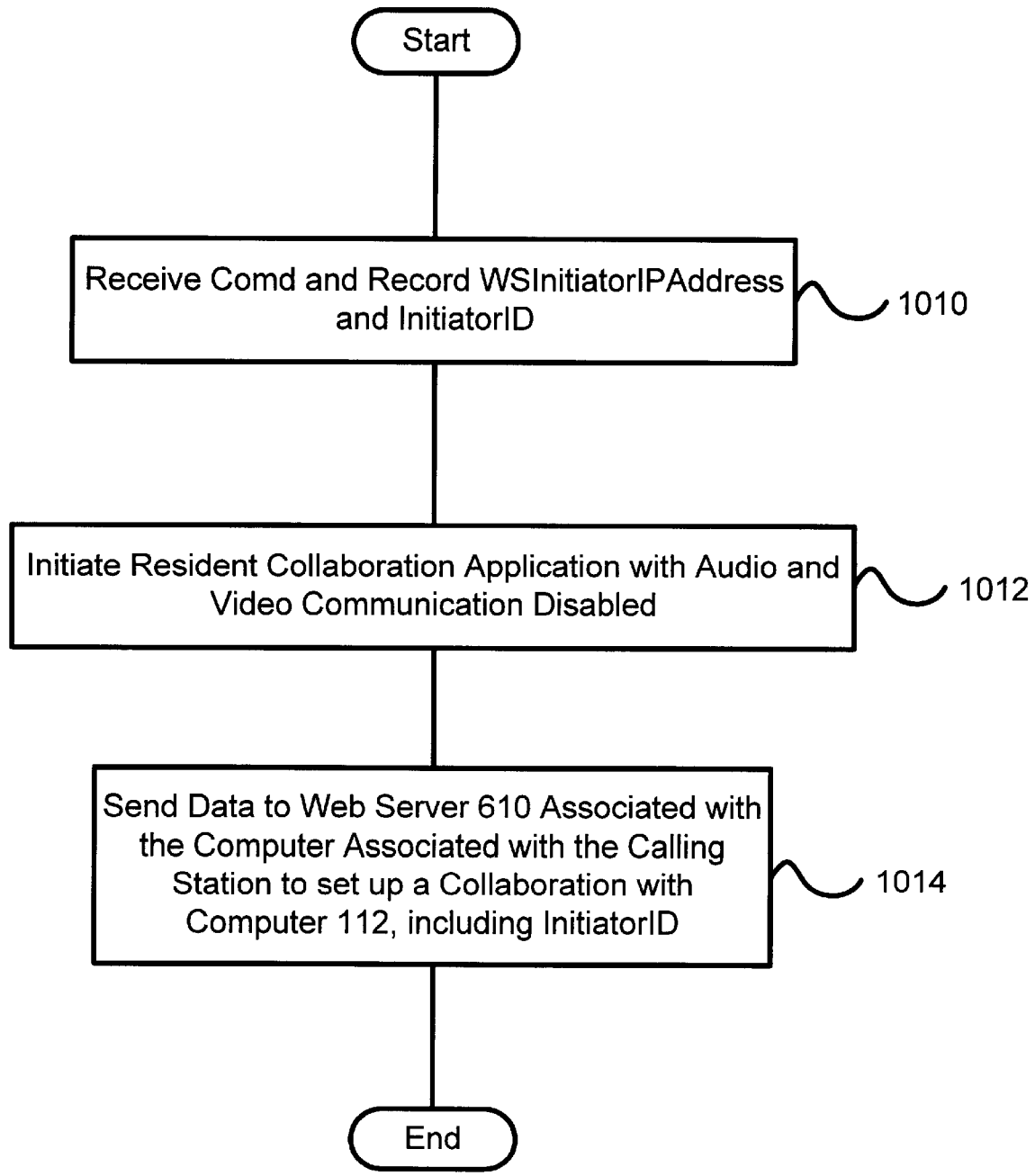
FIG. 10 is a flow diagram of a method of operating a personal computer associated with a called station in accordance with the present invention.

The operation of personal computer 512 after receiving the data from web server 614 is illustrated in FIG. 10. Turning to FIG. 10, computer 512 first receives the data from web server 614 and stores WSInitiatorIPAddress and InitiatorID (step 1010). Computer 512 then launches a resident collaboration program, with the audio and video communication functions disabled (step 1012). It then sends a message to web server 610 associated with the computer associated with the calling station (at IP address WSInitiatorIPAddress) to set up a collaboration with computer 112, including InitiatorID (step 1014).

Figure 11:
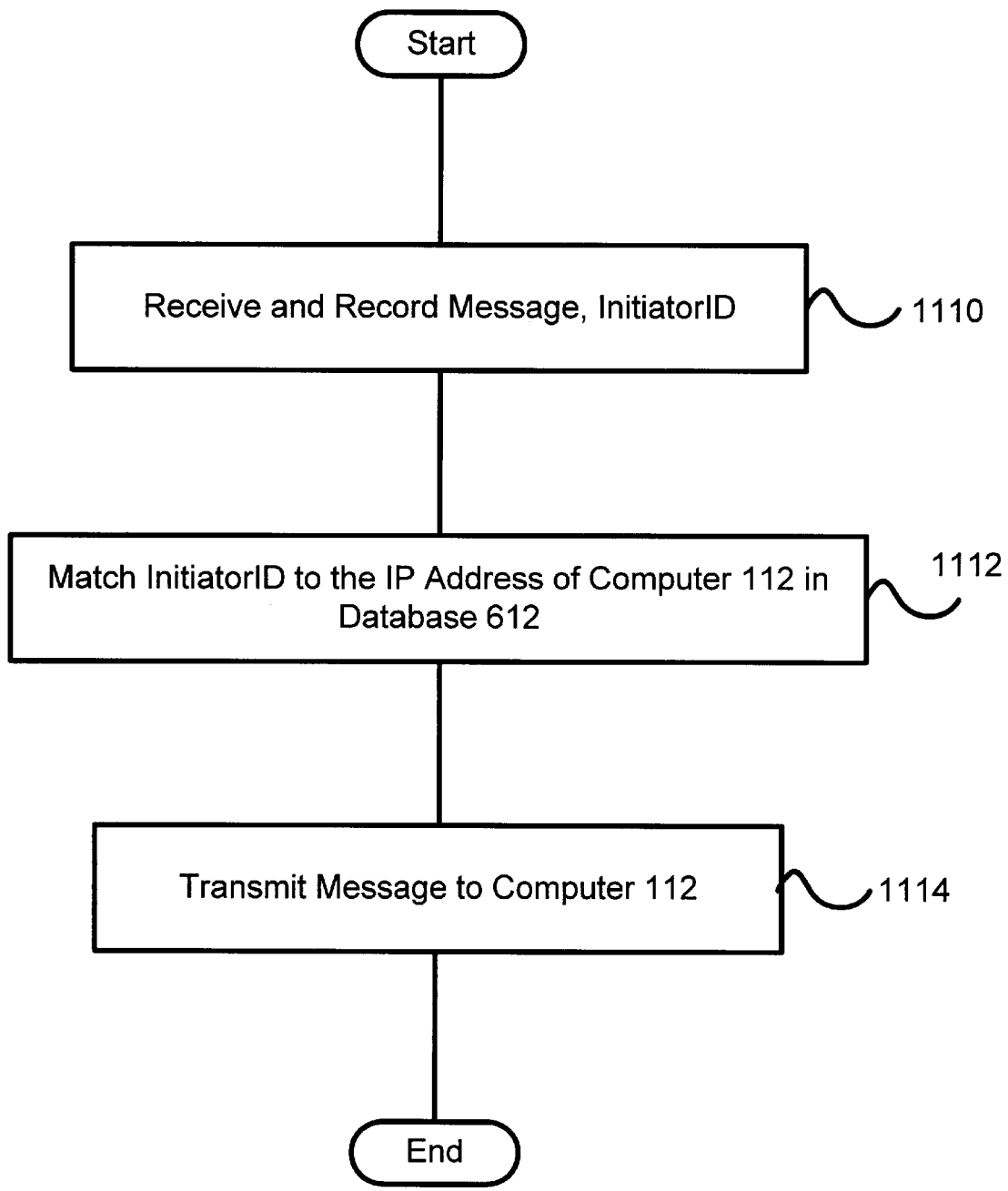
FIG. 11 is a flow diagram of a method of operating a web server associated with a computer associated with a calling station in accordance with the present invention.

The operation of web server 610 after receiving the message from personal computer 512 (in step 1014) is illustrated in FIG. 11. Turning to FIG. 11, web server 610 first receives the message from computer 512 and stores InitiatorID (step 1110). Web server 614 then matches the InitiatorID with the IP address of initiator computer 112 associated with the calling station in database 612 (step 1112). Then web server 610 transmits the received message to personal computer 112 via LAN 124 (step 1114).

Following these steps, the computers 112, 512 can use the data transmittal information WSInitiatorIPAddress, WSRecipientIPAddress, InitiatorID and RecipientID to exchange collaboration data.

It will be appreciated by those skilled in the art that in the above embodiments, the method could be altered so that application 116 instructs the computer 512 of the called station to establish the IP collaboration connection with the calling station.

In an alternative embodiment, the collaboration facility is initiated via a Graphical User Interface (GUI) on a computer 112. The apparatus for this embodiment is identical to that of FIG. 1, except that telephone 111 might not be provisioned with a collaboration button.

In operation, the call initiator launches a collaboration application on computer 112. The call initiator may either turn off the collaboration application's video and audio communication functions, or the collaboration application may automatically launch with the video and audio communication functions disabled. Using the GUI, he chooses an option to start a Collaboration call, and chooses the call recipient. The call recipient may be chosen by selecting from among pre-stored recipients, inputting the name of the recipient, or inputting the phone number of the recipient.

The computer 112 then sends data to application 116 resident in PBX 114 over line 117, including its IP address, an identification number of the called station and of the calling station, and an identifier of the collaboration. Application 116 receives these station identification numbers via an interface such as TAPI (Telephony Applications Programming Interface) by Microsoft™ or TSAPI (Telephony Server Applications Programming Interface) by Novell/H™. Application 116 searches database 118 to find the IP address of computer 122 associated with the called station ("RecipientIPAddress"), which address application 116 transmits back to computer 112 in association with the collaboration identifier and a command to launch the collaboration session with audio disabled. Application 116 also looks up the CLIDs of both the called and calling parties, and then establishes a telephone link between telephone 110 associated with the calling station and telephone 120 associated with the called station through PBX 114.

Computer 112 then uses the RecipientIPAddress to establish a collaboration connection between itself and computer 122 associated with the called station through LAN 124. Alternatively, instead of receiving RecipientIPAddress from application 116, the IP address of the computer associated with the called station may have been stored on computer 112, or may have been entered directly by the collaboration call initiator.

By following these steps, a telephone connection will have been established between the calling and called stations to allow voice communication, and a data network connection will have been established between the computers of the calling and called stations to allow data communication. It will be apparent to those skilled in the art that this approach can be extended to allow the calling party to initiate a collaboration from a GUI in cases where: (1) the computers associated with the calling and called stations are connected by separate LANs and the Internet without firewalls to prevent the direct addressing of the computers (as in FIG. 5); or (2) the computers associated with the calling and called stations are connected by separate LANs and the Internet with firewalls to prevent the direct addressing of the computers (as in FIG. 6).

In another embodiment, the non-voice collaboration may be initiated by either party subsequent to a telephone connection being established. The apparatus for this embodiment is identical to that of FIG. 5, except that both telephone 110 and telephone 510 are provided with collaboration buttons.

In operation of this embodiment, the parties first establish a telephone connection between telephone 110 and 510 via PBX 114. If one of the parties decides to initiate a collaboration, he presses the collaboration button on his telephone. Pressing this button will transmit a signal to start a collaboration and an identification number of the person pressing the collaboration button to application 116 in PBX 114, either directly from telephone 110 or from telephone 510 via PSTN 514. The operation of this system will then proceed as described in conjunction with FIG. 5, with the following changes:

(I) In step 210, application 116 will receive and record the identification number of the person pressing the collaboration button, and will determine the identification number of the person to whom the person initiating the collaboration is speaking via PBX 114. The identification number of the person whose station is directly connected to PBX 114 (computer 112 and telephone 110 in FIG. 5) is recorded as the call Initiator; the identification number of the person whose station is not directly connected to PBX 114 (computer 512 and telephone 510 in FIG. 5) is recorded as the call Recipient.

(II) It is not necessary to obtain the Recipient's CLID in step 212.

(III) Step 216 is not necessary.

By following these steps, a data network connection will have been established between computers 112 and 512 of the two stations to allow data communication. It will be apparent to those skilled in the art that this approach can be extended to allow either party to initiate a collaboration in cases where: (1) the computers associated with the calling and called stations are connected to the same LAN (as in FIG. 1); or (2) the computers associated with the calling and called stations are connected by separate LANs and the Internet with firewalls to prevent the direct addressing of the computers (as in FIG. 6).

It will also be apparent to those skilled in the art that this approach can be extended to allow either party to initiate a collaboration using a graphical user interface (GUI). In the case where the collaboration is requested by a computer not attached to the LAN attached to the PBX having application 116 (computer 512 in the embodiment of FIG. 5), the initial communication between computer 512 and application 116 may take place using a "Remote TAPI" interface, which allows a remote computer to communicate with the PBX having application 116.

When contacting another computer using IP (whether on a LAN or between LANs over the Internet), it is, of course, necessary to know the IP address of the person you are trying to contact. However, most people who use a modem to connect to the Internet will have a dynamic address, in that their address will be different each time they log on to the Internet. A common solution to this problem is to use a directory server, a centralized software program that stores current IP address information for people who are presently running a collaboration program. The computer of the described embodiments can be designed to automatically send their current IP addresses to this directory server whenever they log on to the network. On a LAN, the IP addresses can be either constant or dynamic: if they are dynamic, a similar solution will be needed.

The collaborations in the described examples are for collaborations between two people. It will be apparent to people skilled in the art that by using IP multi-casting (to send information from one IP address to several simultaneously) or by repeatedly sending information to several IP addresses, multi-party collaboration sessions can be created within the spirit and teachings of the invention described herein.

While the data networks in the described examples were packetized data networks according to Internet Protocol, the teachings of this invention have application to other packetized data networks, such as Asynchronous Transfer Mode (ATM) and Frame Relay networks.

As will be apparent to a person skilled in the art, the present invention may be of particular use when used in conjunction with a phone having an integrated screen for information display and whose capabilities include a browser application, such that a separate computer would not be required.

It will be further understood that the invention is not limited to the embodiments described herein which are merely illustrative of a preferred embodiment of carrying out the invention, and which are susceptible to modification of form, arrangement, of parts, steps, details, and order of execution. The invention, rather, is intended to encompass all such modification within its spirit and scope, as defined by the claims.

What is claimed is:

1. A method for establishing a collaborative session between a calling station and a called station, comprising:
   receiving an identifier of a first station and second station, each of said first station and second station comprising a telephone connected to a switched telephone network and a computer connected to a data network;
   causing establishment of a telephone connection between said telephone of said first station and said telephone of said second station over said switched telephone network where such a connection does not already exist;
   commanding said computer of said first station to launch a collaborative session with said computer of said second station over said data network with audio disabled.

2. The method of claim 1 further comprising determining a data network address of a computer associated with said second station and passing said data network address to said computer of said first station while undertaking said commanding.

3. The method of claim 2 wherein said data network is a packetized data network following the Internet Protocol and said determining comprises determining an Internet Protocol data network address.

4. The method of claim 3 wherein said collaborative session allows at least one of video communication, application sharing, file transfer, whiteboard, and chat.

5. The method of claim 2, wherein said data network is a packetized data network and wherein said command comprises instructing the computer associated with the first station to:
   (I) contact a web server associated with the computer associated with the second station via said Packetized Data Network;
   (II) send instructions via a web server associated with the computer associated with the second station to instruct the computer associated with the second station to launch a collaboration application with the audio communication function disabled;
   (III) send instructions via a web server associated with the computer associated with the second station to instruct the computer associated with the second station to establish a collaboration by contacting a web server associated with the computer associated with the first station.

6. The method of claim 2, wherein said receiving comprises receiving identifiers of the first station and the second station through said first station telephone.

7. The method of claim 2, wherein said receiving comprises receiving identifiers of the first station and the second station through a graphical user interface on said first station computer.

8. The method of claim 4, wherein said causing establishment comprises establishing a telephone connection between the first station telephone and the second station telephone through a Private Branch Exchange.

9. The method of claim 4, wherein said causing establishment comprises establishing a telephone connection between the first station telephone and the second station telephone through a Private Branch Exchange.

10. A method for establishing a collaborative session between a calling station and a called station, comprising:

receiving an identifier of a first station and a second station, each of said first station and second station comprising a telephone connected to a switched telephone network and a computer connected to a data network;

causing establishment of a telephone connection between said telephone of said first station and said telephone of said second station over said switched telephone network;

commanding said computer of said first station to launch a collaborative session with said computer of said second station over said data network with audio disabled.

11. A computer readable medium storing computer executable instructions, comprising:

means for receiving an identifier of a first station and a second station, each of said first station and second station comprising a telephone connected to a switched telephone network and a computer connected to a data network;

means for causing establishment of a telephone connection between said telephone of said first station and said telephone of said second station over said switched telephone network where such a connection does not already exist;

means for commanding said computer of said first station to launch a collaborative session with said computer of said second station over said data network with audio disabled.

12. The computer readable medium storing computer executable instructions of claim 11 further comprising:

means for determining a data network address of a computer associated with said second station and passing said data network address to said computer of said first station while undertaking said commanding.

13. A computer data signal embodied in a carrier wave and representing sequences of instruction which, when executed by a processor, cause the processor to perform steps comprising:

receiving an identifier of a first station and a second station, each of said first station and second station comprising a telephone connected to a switched telephone network and a computer connected to a data network;

causing establishment of a telephone connection between said telephone of said first station and said telephone of said second station over said switched telephone network where such a connection does not already exist;

commanding said computer of said first station to launch a collaborative session with said computer of said second station over said data network with audio disabled.

14. The computer data signal embodied in a carrier wave and representing sequences of instructions which, when executed by a processor, cause the processor to perform the steps of claim 13 further comprising:

determining a data network address of a computer associated with said second station and passing said data network address to said computer of said first station while undertaking said commanding.

15. Apparatus for automating the establishment of a collaborative session between a calling station and a called station, comprising:

means for receiving an identifier of a first station and a second station, each of said first station and second station comprising a telephone connected to a switched telephone network and a computer connected to a data network;

means for causing establishment of a telephone connection between said telephone of said first station and said telephone of said second station over said switched telephone network where such a connection does not already exist;

means for commanding said computer of said first station to launch a collaborative session with said computer of said second station over said data network with audio disabled.

16. The apparatus of claim 15, further comprising:

means for determining a data network address of a computer associated with said second station and passing said data network address to said computer of said first station while undertaking said commanding.

17. A method for establishing a collaborative session between a calling station and a called station, comprising:

receiving an identifier of a first station and second station, each of said first station and second station comprising a telephone connected to a switched telephone network and a computer connected to a local area network, with the local area networks interconnected via a data network, and said data network is a packetized data network following an Internet Protocol;

causing establishment of a telephone connection between said telephone of said first station and said telephone of said second station over said switched telephone network where such a connection does not already exist;

commanding said computer of said first station to launch a collaborative session with said computer of said second station over said data network with audio disabled.

* * * * *